United States Patent [19]

Takizawa et al.

[11] Patent Number: 5,471,331
[45] Date of Patent: Nov. 28, 1995

[54] SPATIAL LIGHT MODULATOR ELEMENT WITH AMORPHOUS FILM OF GERMANIUM, CARBON AND SILICON FOR LIGHT BLOCKING LAYER

[75] Inventors: Kuniharu Takizawa; Hiroshi Kikuchi, both of Setagaya; Yukihisa Osugi; Shoji Tange, both of Nagoya, all of Japan

[73] Assignees: Nippon Hōsō Kyōkai; NGK Insulators, Ltd., both of Japan

[21] Appl. No.: 10,301

[22] Filed: Jan. 28, 1993

[30] Foreign Application Priority Data

| Feb. 4, 1992 | [JP] | Japan | 4-018987 |
| Feb. 4, 1992 | [JP] | Japan | 4-018988 |
| Feb. 4, 1992 | [JP] | Japan | 4-018989 |

[51] Int. Cl.⁶ .......................... G02F 1/1335; G02F 1/135
[52] U.S. Cl. ................................. 359/67; 359/72
[58] Field of Search .......................... 359/67, 72

[56] References Cited

U.S. PATENT DOCUMENTS

| 5,084,777 | 1/1992 | Slobodin | 359/72 |
| 5,132,814 | 7/1992 | Ohkouchi et al. | 359/72 |
| 5,148,298 | 9/1992 | Shigeta et al. | 359/72 |
| 5,178,445 | 1/1993 | Moddel et al. | 359/72 |
| 5,260,815 | 11/1993 | Takizawa | 359/72 |
| 5,272,554 | 12/1993 | Ji et al. | 359/72 |

FOREIGN PATENT DOCUMENTS

| 0412843 | 2/1991 | European Pat. Off. . |
| 3-221924 | 9/1991 | Japan . |
| 91/07689 | 5/1991 | WIPO . |

OTHER PUBLICATIONS

Takizawa et al., "Transmission mode spatial light modulator using a $Bi_{12}SiO_{20}$ crystal and polymer–dispersed liquid–crystal layers", Appl. Phys. Lett., vol. 56, No. 11, (Mar. 1990), pp. 999–1001.

T. D. Beard et al., "AC Liquid–Crystal Light Valve", Appl. Phys. Lett. vol. 22, No. 3 (Feb. 1, 1973), pp. 90–92.

*Primary Examiner*—Anita Pellman Gross
*Attorney, Agent, or Firm*—Parkhurst, Wendel & Rossi

[57] ABSTRACT

A spatial light modulator includes at least a photoconductive layer, one transparent electrode film provided on one surface of the photoconductive layer, a light blocking layer provided on the other surface of the photoconductive layer, a dielectric multilayered film provided on the light blocking layer, a light modulation layer provided on the dielectric multilayered film, and the other transparent electrode film provided on the surface of the light modulation layer, said light modulation layer consisting of a liquid crystal material for changing intensity, phase or running direction of read-out light by applying a voltage, wherein the light blocking layer is an amorphous film consisting essentially of 5–45 atomic % of germanium, 17.5–92.5 atomic % of carbon and 2.5–77.5 atomic % of silicon. Thereby, the magnification of the intensity of read-out light to intensity of write-in light can be increased.

14 Claims, 8 Drawing Sheets

FIG_1
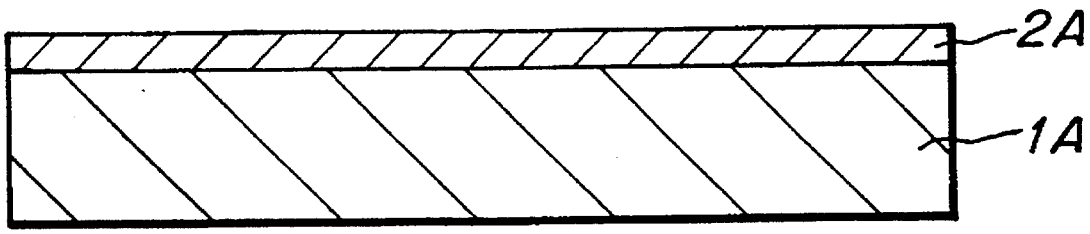
FIG_2
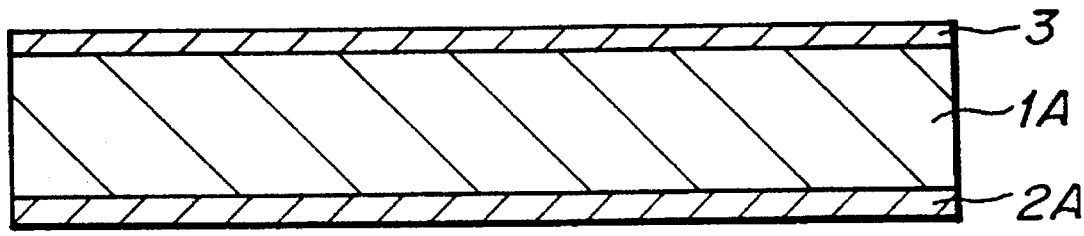
FIG_3
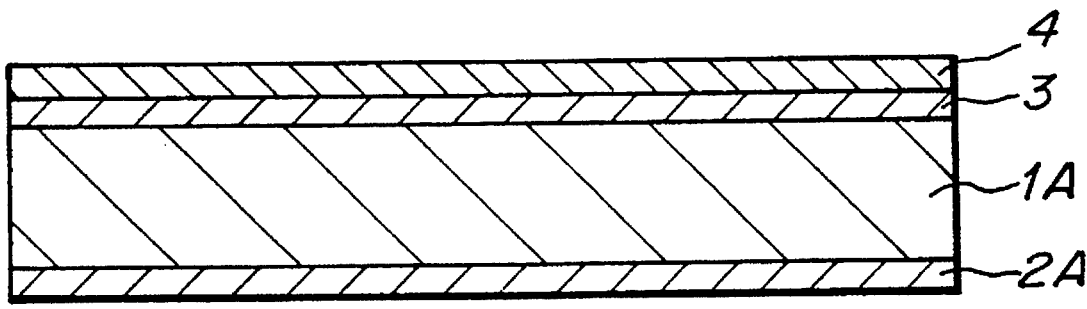

FIG._4
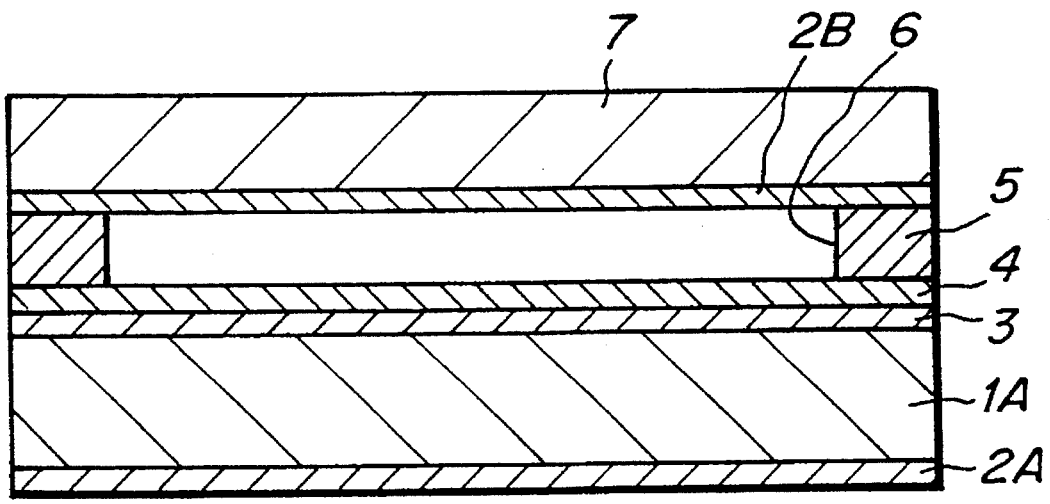
FIG._5
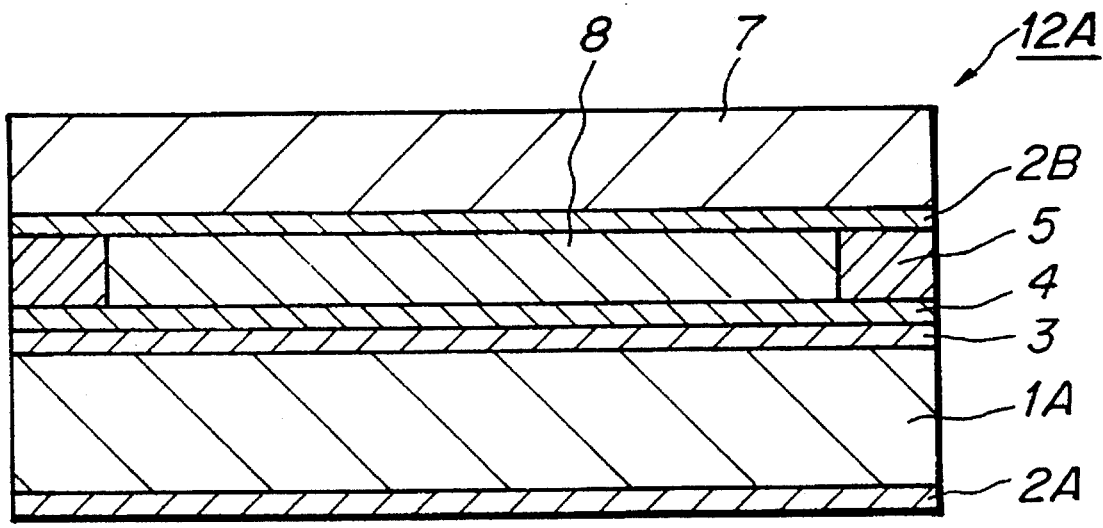

FIG_6
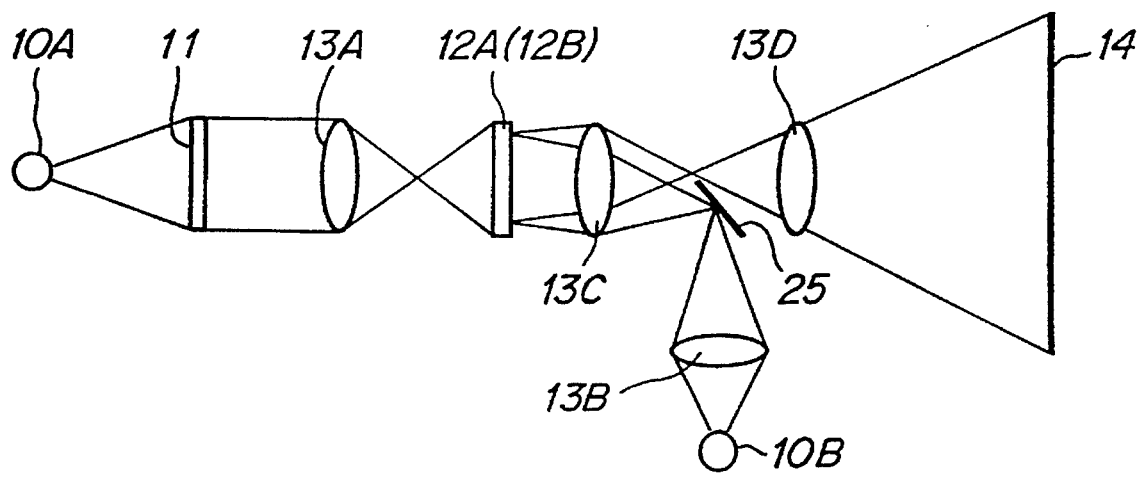
FIG_7
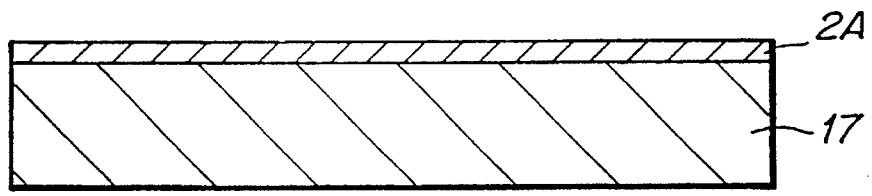
FIG_8
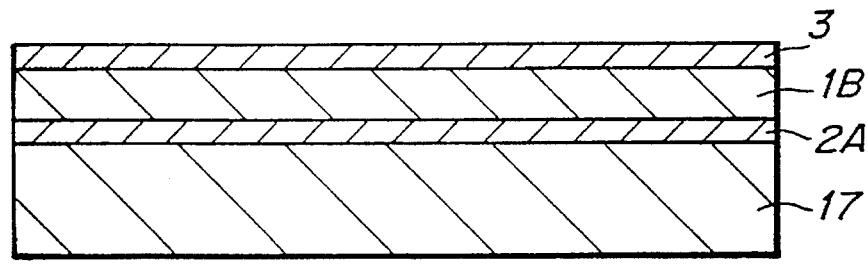

FIG_9
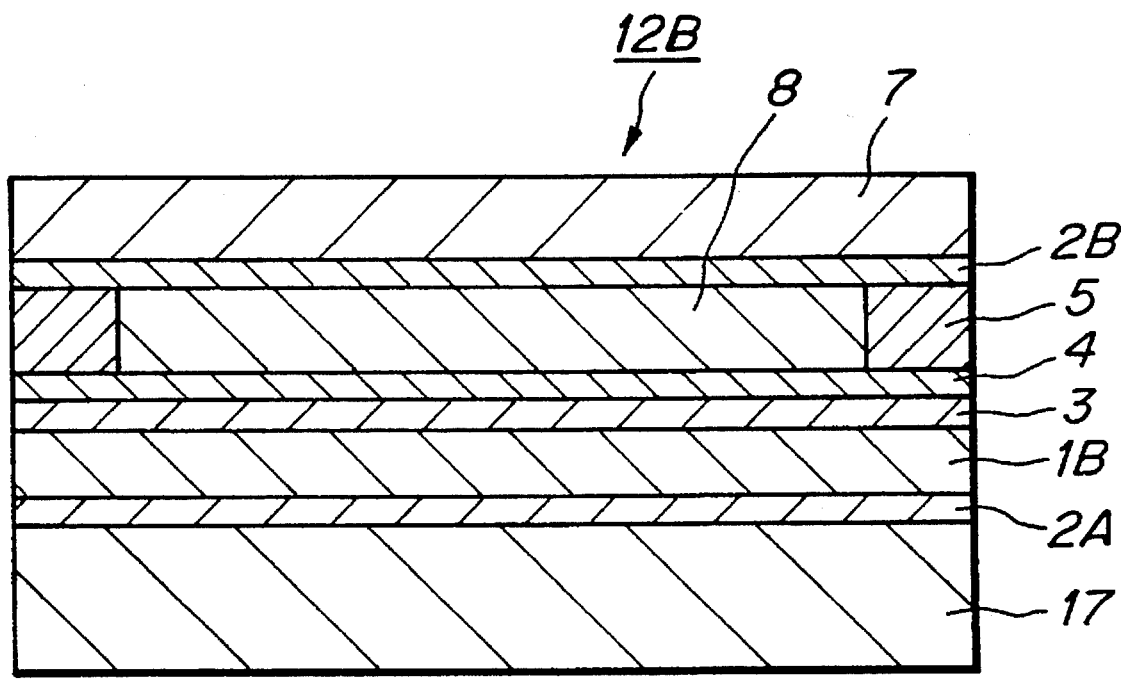

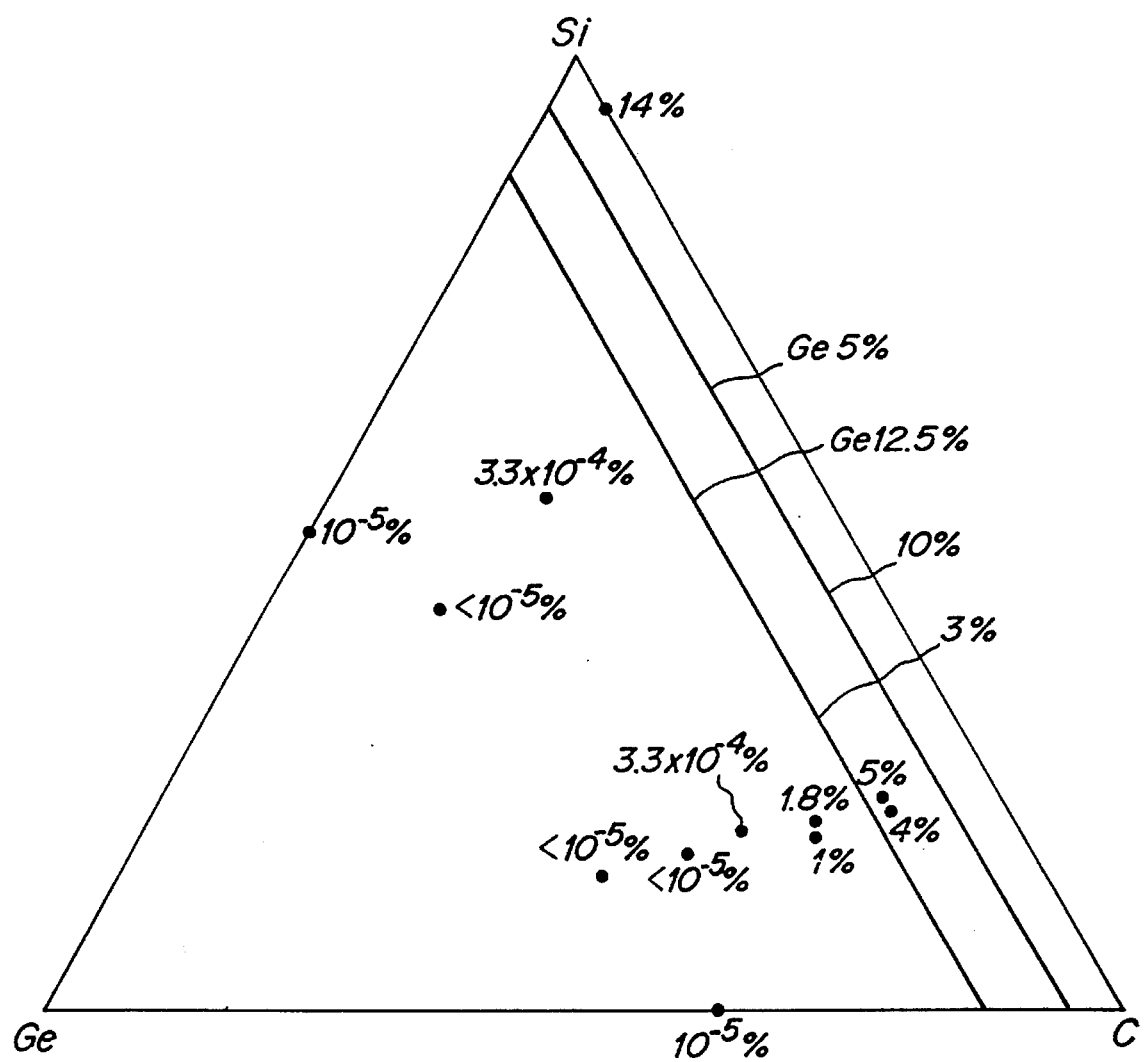
FIG_10

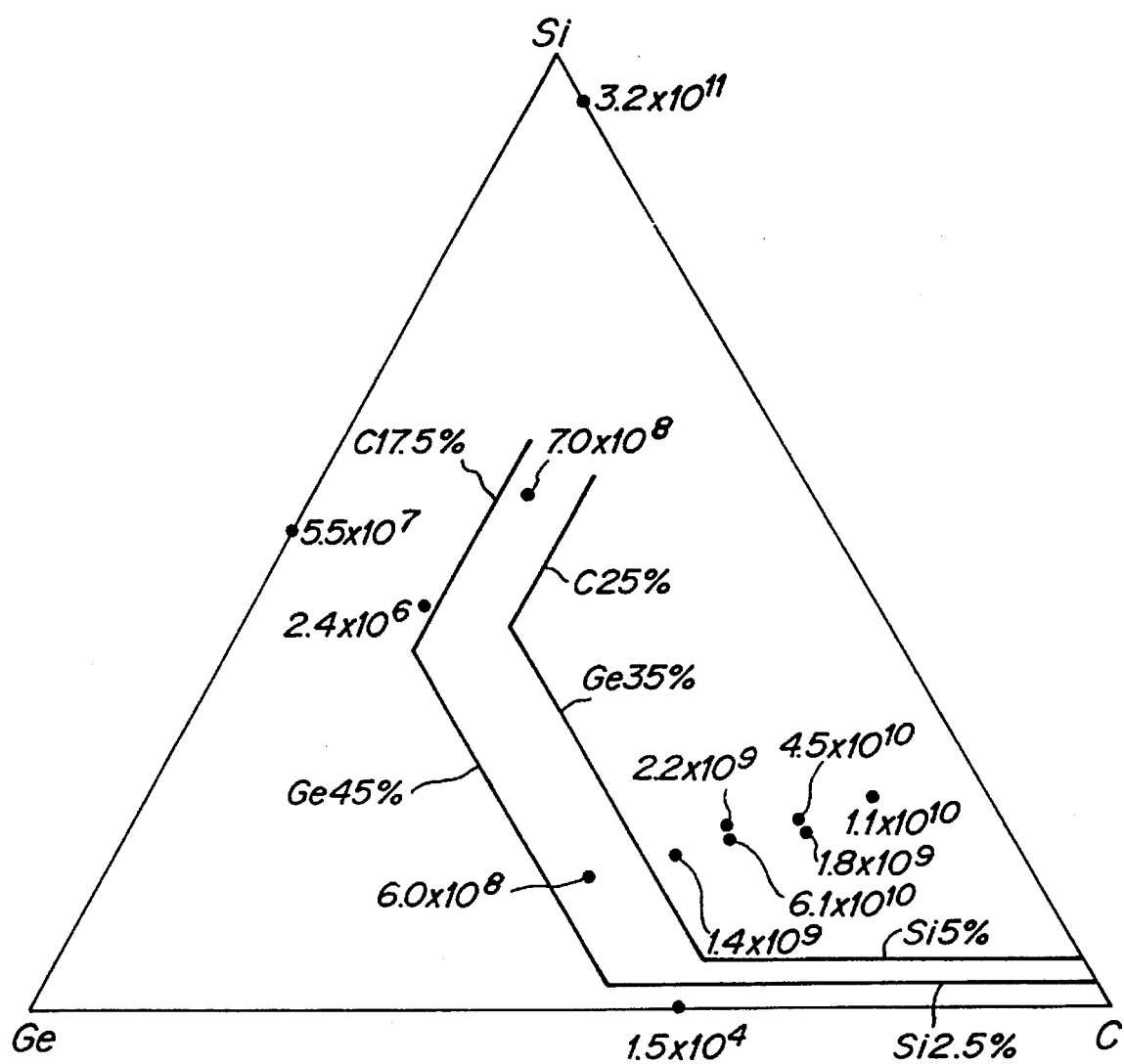
FIG_11

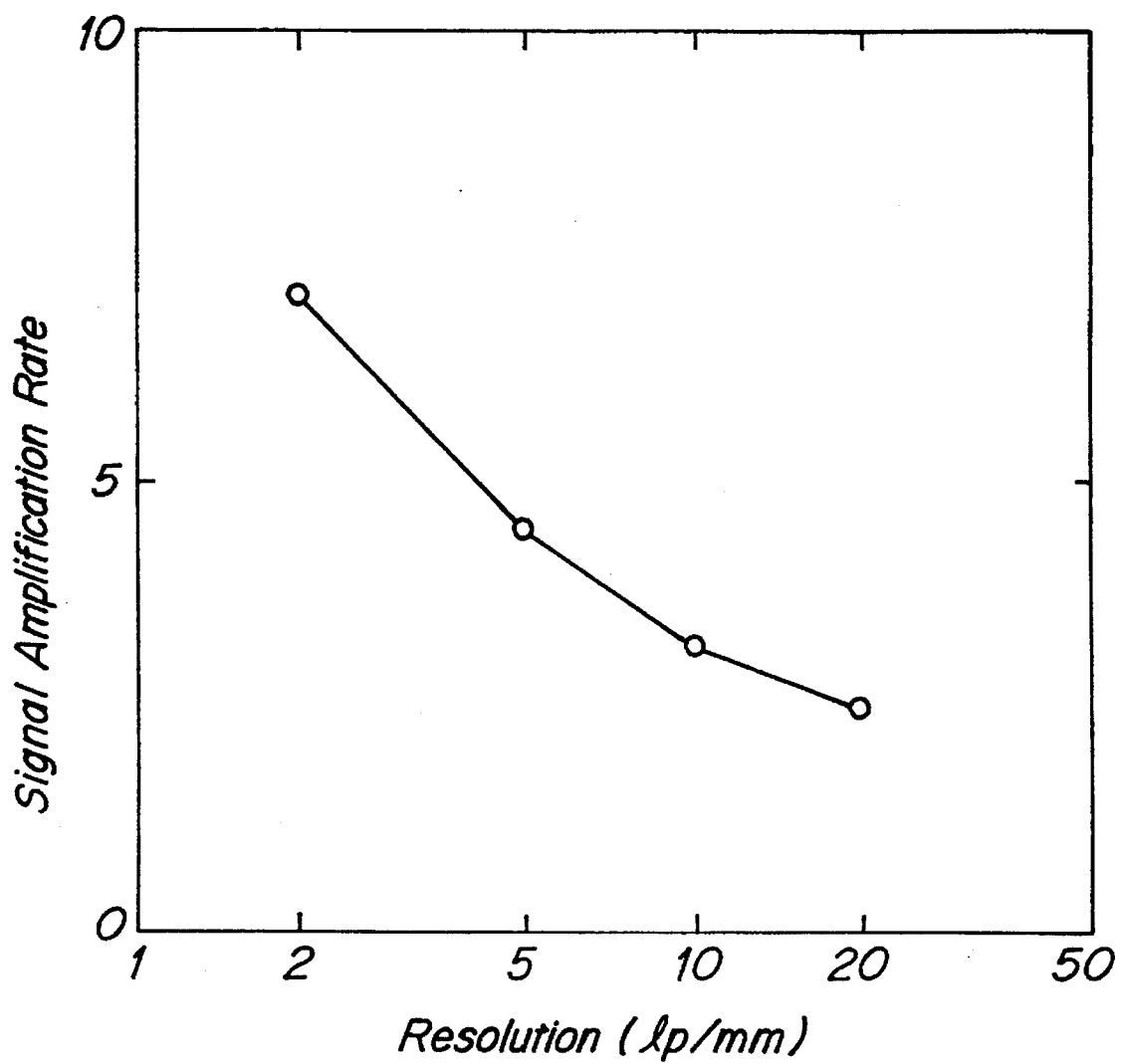
FIG_13

SPATIAL LIGHT MODULATOR ELEMENT WITH AMORPHOUS FILM OF GERMANIUM, CARBON AND SILICON FOR LIGHT BLOCKING LAYER

BACKGROUND OF THE INVENTION

1. Field of the Invention

The present invention relates to a spatial light modulator element used for projection display.

2. Description of the Prior Art

There are three approaches to development of projection display. In these three approaches, the projection display with the use of a Braun tube has a limit in brightness of the Braun tube and a fault that a device becomes large-sized, thereby limiting enlargement of display area. On the other hand, in case of the liquid crystal projection display consisting of a liquid crystal panel having thin film transistor array, there are problems such as insufficient resolution of the liquid crystal panel, small pixel opening ratio of the liquid crystal panel, photocurrent generation by irradiation of light in the thin film transistor array consisting of an amorphous silicon thin film, and the like.

Therefore, there is hopefully expected a projection display assembling a spatial light modulator, a small display and a light source in an enlarged projection optical system. This system once writes a weak image in the spatial light modulator, modulates another read-out light according to this write-in information, and projects the image on a screen.

In a display of this type, the so-called liquid crystal light valve with the use of a nematic liquid crystal for a light modulation layer is common In this system, however, one of P and S polarized light components in read-out light modulated by a liquid crystal layer passes through a polarization beam splitter and is projected on a screen. Therefore, when the read-out light is unpolarized, more than 50% of the light is absorbed by the polarizing beam splitter. As a result, the power of the read-out light projected on the screen becomes low and the beam splitter generates heat.

As a method for solving this problem, there has recently been proposed a new liquid crystal light valve with the aid of a light scattering phenomenon of a polymer-dispersed liquid crystal (PDLC). The PDLC is composite material dispersing liquid crystal droplets into a transparent polymer film such as acryl and the like, and its study has started only several years ago. A liquid crystal light valve of the new type modulates the read-out light incident on the light valve by irradiating a write-in light on the another side of the light valve without a polarization beam splitter. Therefore, it can be expected that the most part of the read-out light can be utilized as a projection light. Moreover, there is no need to provide alignment layers on both side surfaces of a liquid crystal layer, so that it is easy to manufacture a spatial light modulator of a large area. Moreover, the light valve does not modulate the phase of read-out light, so that even if a thickness of the liquid crystal layer is uneven, there is no serious influence upon the spatial uniformity of the read-out light.

However, even in case of using such spatial light modulator, the read-out light is irradiated to a light modulation layer consisting of PDLC. Furthermore, a write-in light is irradiated into a photoconductive layer from the side surface opposite to the read-out light. Therefore, it is necessary to reflect the read-out light between the light modulation layer and the photoconductive layer and to prevent the read-out light from leaking to the photoconductive layer.

For this purpose, it has been known to provide a dielectric multilayered film mirror between the photo-conductive layer and the light modulation layer consisting of PDLC. However, the dielectric multilayered film is made by stacking two kinds of dielectric films having high or low refractive index, and its reflectance is about 90–99% at the most. The read-out light has far greater intensity than the write-in light, so that if a small part of the read-out light leaks to the side of the photoconductive layer, the photoconductive layer is sensitized and its resistance is lowered. Therefore, in order to improve an intensity ratio (amplification ratio) of the read-out light to the write-in light, it is necessary to isolate effectively isolate the read-out light passed through the dielectric multilayered film between the photoconductive layer and the light modulation layer.

A task of the present invention is to intercept effectively the read-out light between a photoconductive layer and a light modulation layer in a spatial light modulator, which is provided with a transparent electrode and a light modulation layer which consists of a liquid crystal material for modulating the intensity, phase or running direction of read-out light by applying a voltage.

SUMMARY OF THE INVENTION

An object of the present invention is to provide a spatial light modulator element comprising at least a photoconductive layer, one transparent electrode provided on one surface of the photoconductive layer, a light blocking layer provided on the other surface of the photoconductive layer, a dielectric multilayered film provided on the light blocking layer, a light modulation layer provided on the dielectric multilayered film, and the other transparent electrode film provided on the surface of the light modulation layer, wherein said light modulation layer is formed by liquid crystal material for modulating intensity, phase or running direction of read-out light in accordance with an applied voltage, and said light blocking layer is an amorphous film consisting essentially of 5–45 atomic % of germanium, 17.5–92.5 atomic % of carbon and 2.5–77.5 atomic % of silicon.

Another object of the present invention is to provide a spatial light modulator comprising at least a photoconductive layer, one transparent electrode film provided on one surface of the photoconductive layer, a light blocking layer provided on the other surface of the photoconductive layer, a dielectric multilayered film provided on the light blocking layer, a light modulation layer provided on the dielectric multilayered film, and the other transparent electrode film provided on the surface of the optical modulation layer, wherein said optical modulation layer is formed by liquid crystal material for modulating intensity, phase or running direction of read-out light in accordance with an applied voltage, and said light blocking layer consists of an amorphous film consisting essentially of at least one element selected from the group consisting of silicon, germanium and carbon.

A further object of the present invention is to provide a spatial light modulator comprising at least a photoconductive layer, one transparent electrode film provided on one surface of the photoconductive layer, a light blocking layer provided on the other surface of the photoconductive layer, a dielectric multilayered film provided on the light blocking layer, a light modulation layer provided on the dielectric multilayered film, and the other transparent electrode film provided on the surface of the light modulation layer, wherein said light modulation layer is formed by liquid crystal material for modulating intensity, phase or running direction of read-out light in accordance with an applied voltage, and said light blocking layer consists of a hydrogenated amorphous silicon film having a resistivity of $10^8$ Ωcm to $10^{10}$ Ωcm and a light absorption coefficient of $10^4$ cm$^{-1}$ to $10^5$ cm$^{-1}$ to a light of wavelength of 600 nm.

Liquid crystal material may be preferably made of material selected from nematic liquid crystal, cholesteric liquid crystal, smectic liquid crystal and PDCL. A photoconductive layer may be preferably formed with a single crystal selected from a single crystal of $B_{12}SiO_{20}$, a single crystal of $B_{12}GeO_{20}$ and a single crystal of GaAs. The photoconductive layer is further preferably formed with GaAs film, a film selected from a hydrogenated amorphous silicon film, a hydrogenated amorphous silicon carbide film and amorphous selenium film.

BRIEF DESCRIPTION OF THE DRAWINGS

For a better understanding of the invention, reference is made to the accompanying drawing, in which:

FIG. 1 is a cross-sectional view showing the state of forming one transparent electrode film 2A on the surface of a photoconductive layer 1A.

FIG. 2 is a cross-sectional view showing the state of providing a light blocking layer 3 on the photoconductive layer 1A.

FIG. 3 is a cross-sectional view showing the state of providing a dielectric multilayered film 4 on the surface of the light blocking layer 3.

FIG. 4 is a cross-sectional view showing the state of providing a seal member 5 between the dielectric multilayered film 4 and the other transparent electrode film 29.

FIG. 5 is a cross-sectional view showing a spatial light modulator 12A.

FIG. 6 is a schematic diagram showing one embodiment of an optical projection system.

FIG. 7 is a cross-sectional view showing the state of providing one transparent electrode film 2A on the surface of a glass substrate 17.

FIG. 8 is a cross-sectional view showing the state of successively providing a photoconductive layer 1B and a light blocking layer 3 on the surface of the transparent electrode film 2A.

FIG. 9 is a cross-sectional view showing a spatial light modulator 12B.

FIG. 10 is a diagram of ternary system of Si-Ge-C showing the relation between composition and transmittance of the light blocking layer 3.

FIG. 11 is a diagram of ternary system of Si-Ge-C showing the relation between composition and transmittance of the light blocking layer 3.

FIG. 13 is a graph showing the relation between resolution and signal amplification factor when a spatial light modulator of a comparative example is operated. 1A, 1B are photoconductive layer, 2A is one transparent electrode film, 2B is other transparent electrode film, 3 is a light blocking layer, 4 is a dielectric multilayered film, 6 and 17 are glass substrates, 8 is a light modulation layer consisting of liquid crystal material, 12A, 12B, 20B, 20R and 20G are spatial light modulators, 14 and 27 are screens, 21B, 21R and 21G are liquid crystal panels, 23 a is white light source, 26B and 26R are dichroic mirrors.

EXAMPLE 1

Figure 12:
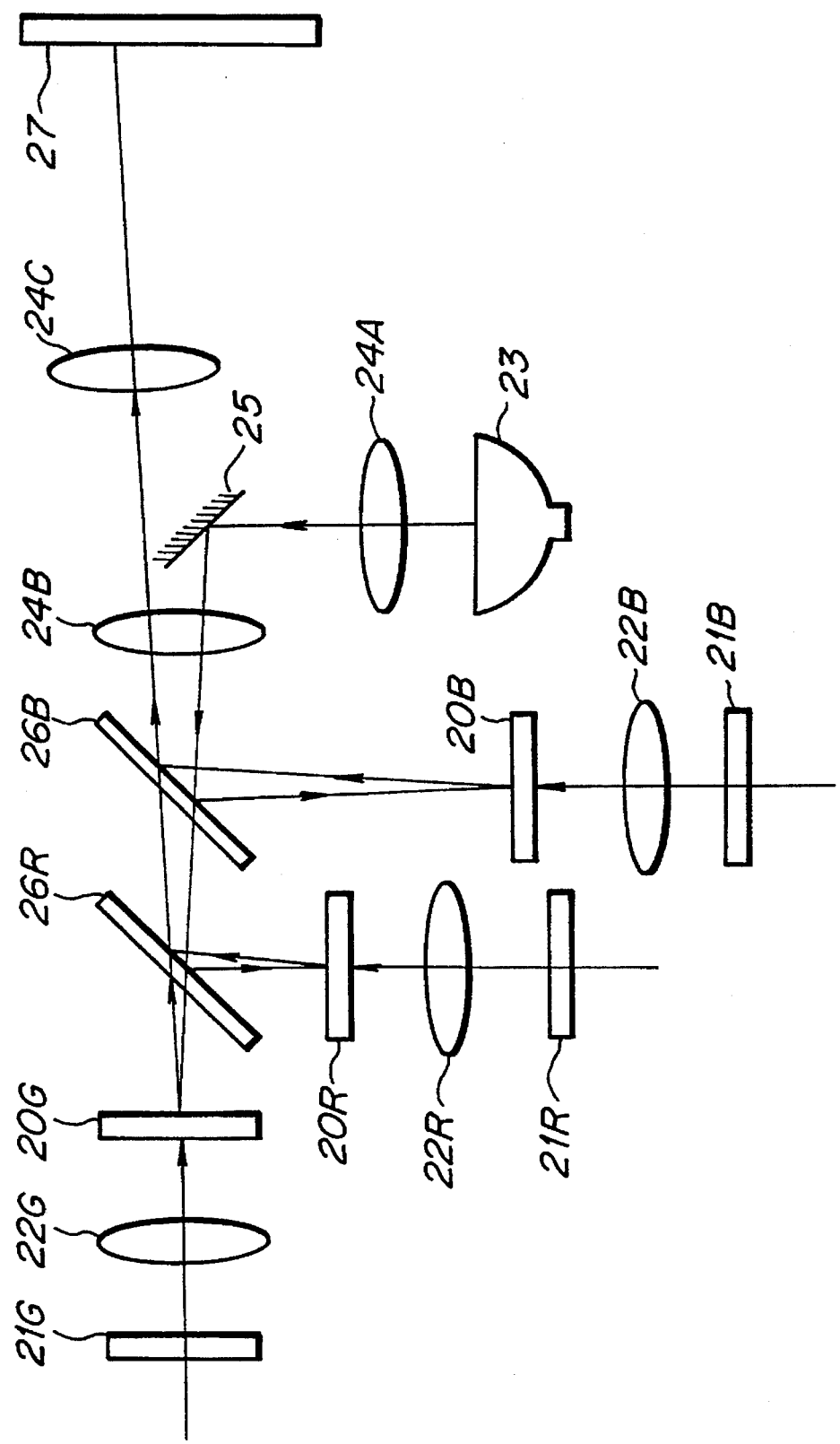
FIG. 12 is a schematic diagram showing one embodiment of a full color optical projection system.

A process for manufacturing a spatial light modulator 12A relating to an embodiment of the present invention is successively explained by referring to FIGS. 1–5. In the present embodiment, as a photoconductive layer 1A, use is made of a single crystal selected from $Bi_{12}SiO_{20}$ single crystal or $Bi_{12}GeO_{20}$ single crystal or GaAs single crystal.

First, a photoconductive layer 1A consisting of these single crystals is cut from a single crystal wafer, and one transparent electrode film 2A is provided on one surface of the photoconductive layer 1A (FIG. 1).

Second, as shown in FIG. 2, a light blocking layer 3 is provided on the other surface of the photoconductive layer 1A according to the present invention as shown in FIG. 2. The construction and the method of manufacturing of the light blocking layer 3 will be explained later on.

Third, as shown in FIG. 3, a dielectric multilayered film 4 is provided by deposition on the surface of the light blocking layer 3.

On the other hand, as shown in FIG. 4, the other transparent electrode film 2B is formed on the surface of a glass substrate 7. The dielectric multilayered film 4 and the transparent electrode film 2B are opposed to each other by sandwiching a seal member 5 containing spacers. A flat plate-shaped space 6 is formed between the dielectric multilayered film 4, the transparent electrode film 2B and the seal member 5.

In the present embodiment, a polymer-dispersed liquid crystal (PDLC) as liquid crystal material is made of by dispersing liquid crystal droplets in a transparent polymer film. As an actual method of manufacturing, a mixture of non-cured nematic liquid crystal and resin matrix is injected from an injection hole in the same manner as the conventional twist nematic liquid crystal, the injection hole is sealed and thereafter the mixture was cured. As a result, an optical modulation layer 8 consisting of PDLC is formed within the space 6 as shown in FIG. 5.

There is another manufacturing method without using any seal member.

That is, for example, a mixture of non-cured nematic liquid crystal and resin matrix is supplied onto a substrate provided with a transparent electrode, thereafter a photoconductive layer adhering a dielectric multilayered film and a transparent electrode thereto is layered and cured by irradiation and the like. It is of course preferable to apply a seal member in the circumference and the circumference is sealed thereafter. According to this manufacturing method, a mixture of non-cured nematic liquid crystal and resin matrix is simply supplied by application by means of roll coat, spin coat, printing and dispenser, so that the injection step is simple and the productivity is extremely high.

Moreover, to the mixture of non-cured nematic liquid crystal and resin matrix can be added ceramic particles and plastic particles for controlling a substrate gap, spacer such as glass fiber and the like, pigment, dye, viscosity modifier, and other additives giving no bad influence upon performance of liquid crystal.

The behavior of the spatial light modulator is then explained by referring to a schematic diagram of projector of FIG. 6. The write-in light illuminated from a light source 10A of weak write-in light becomes an input image light by passing through a liquid crystal television 11, and this input image light is condensed by a lens 13a and irradiated to a spatial light modulator 12A. This input image light passes through a transparent electrode film 2A and is incident to a photoconductive layer 1A. On the other hand, read-out light emitted from a light source 10B of read-out light having high luminance is condensed at a lens 13B, reflected by a mirror 25, regulated by a lens 13C and becomes incident into an optical modulation layer 8 (as referred to FIG. 5).

As referred to FIG. 5 and FIG. 6, this incident light is mainly reflected by a dielectric multilayered film 4, passed through the optical modulation layer 8 once more, condensed at the lens 13C and projected onto a screen 4 by passing through a lens 13D.

The write-in light is shaded by the liquid crystal television 11. At the portion where no light is incident on the photoconductive layer 1A, almost voltage is applied along the photoconductive layer 1A. Therefore, a voltage applied to the light modulation layer 8 does not reach a threshold voltage of the light modulation layer 8. On the other hand, when the write-in light is incident on the photoconductive layer 1A, the electric resistance of the photoconductive layer 1A is largely lowered at that portion, and the voltage applied along the light modulation layer 8 is increased to exceed the threshold value.

When a voltage is not applied to a light modulation layer 8, liquid crystal molecules are aligned along the interface between polymer and liquid crystal in the inside of the light modulation layer 8 consisting of PDLC. The shape of a liquid crystal droplet is irregular. When a voltage applied to the light modulation layer 8 is low, refractive indices of the liquid crystal droplet and the polymer are largely different from each other, so that the read-out light often changes its running direction within the light modulation layer 8 and scatters. On the other hand, when the voltage applied to the light modulation layer 8 exceeds the threshold voltage and the liquid crystal molecule is oriented to the direction of an electric field, the read-out light passes through the light modulation layer 8 without scattering.

With the above mechanism, two-dimensional image information having the write-in light is transferred to the read-out light. If the intensity of the read-out light is larger than that of the write-in light, the signal amplification factor becomes higher.

As described above, the dielectric multilayered film 4 reflects only 90–99% of the read-out light. Therefore, a part of the read-out light passes through the dielectric multilayered film 4 and incident on the photoconductive layer 1A. The more stronger the intensity of the read-out light becomes, the more stronger the light is incident on the photoconductive layer 1A as described above, and the photoconductive layer 1A is sensitized.

Therefore, in order to increase a signal amplification factor, it is necessary to provide a light blocking layer 3 for blocking the read-out light passed through the dielectric multilayered film 4 between the photoconductive layer 1A and the dielectric multilayered film 4. However, conflicting properties are required for the light blocking layer 3. That is, the light blocking layer 3 should have high light absorption coefficient, thereby enabling to increase intensity of the read-out light. However, the light blocking layer having the high read-out light absorption coefficient usually lowers its resistivity when light is absorbed. In such a case, the resolution of the spatial light modulator is rapidly deteriorated, and a projected image becomes unclear and blurred.

The present inventors have solved the above shortcoming of antimony, and discovered a new light blocking layer which can increase intensity of the read-out light and can prevent the resolution of modulator from deteriorating. Thus, it becomes possible to obtain brighter projected image having the high resolution.

The light blocking layer used in the present invention is an amorphous film consisting essentially of 5–45 atomic % of germanium, 17.5–92.5 atomic % of carbon and 2.5–77.5 atomic % of silicon. "Consisting essentially of" means that inevitable impurities are permissible.

As a composition of contained elements for constructing the above amorphous film, 12.5–35 atomic % of germanium is further preferable.

In order to form a light blocking layer 3, it is preferable to use a plasma chemical vapor deposition method (i.e plasma CVD method) by using a mixed gas of monosilane, hydrogenated germanium, methane or ethane since the composition of a light blocking layer can suitably be changed by changing a flow rate of monosilane, hydrogenated germanium, and methane (or ethane).

An embodiment using a hydrogenated amorphous silicon film as the photoconductive layer is explained by referring to FIGS. 7–9. First, as shown in FIG. 7, one transparent electrode film 2A is provided on a glass substrate 17 which surface is polished smoothly.

As shown in FIG. 8, a photoconductive layer 1B consisting of a hydrogenated amorphous silicon film, is provided on the surface of one transparent electrode film 2A and a light blocking layer 3 on the surface of the photoconductive layer 1B is provided. Thereafter, according to the steps explained in FIGS. 3, 4 and 5, a dielectric multilayered film 4, a light modulation layer 8, the other transparent electrode film 2B and a glass substrate 7 are successively provided. Thus, a spatial light modulator 12B shown in FIG. 9 is obtained. A photoconductive layer 1B consisting of a hydrogenated amorphous silicon film is preferably formed by using plasma CVD method. In this case, as described above, if a light blocking layer 3 is formed by plasma CVD method, a photoconductive layer 1B and a light blocking layer 3 are continuously formed on a transparent electrode film 2A within the same device by using plasma CVD method. It is a matter of course in this case that gas source should suitably be changed. The behavior of a spatial light modulator 12B is the same as that of the above described modulator 12A.

An actual experimental result is described next. First, the composition of the amorphous film applied to the light blocking layer of the present invention and its evaluation result will be explained.

An amorphous film having the composition shown in the following Table 1 was formed by changing the partial pressure of gas source. A method for forming the film was the plasma CVD method. Pressure of the gas source was 50 m-torr, the discharge energy was selected from 40 W, 15 W and 5 W, a substrate temperature was 100° C., and a film thickness was 1 µm. Transmittance of each amorphous film was measured by a spectrophotometer, and resistivity was measured by a two-terminal probe method. The composition of each amorphous film was obtained by a quantitative analysis by means of Auger electron spectroscopy. These results are shown in the following Table 1.

Moreover, FIG. 10 shows a diagram of ternary system of Si-Ge-C for several values of transmittance, and FIG. 11 shows a diagram of ternary system of Si-Ge-C for several values of resistivity.

TABLE 1

| RF power | Composition of film (%) | | | Photo-resistivity [Ωcm] | Optical transmittance (%) at 500 nm |
| --- | --- | --- | --- | --- | --- |
|  | C | Si | Ge |  |  |
| 40W | 62 | 19 | 19 | $1.8 \times 10^9$ | 1.8% |
| 40W | 67 | 22 | 11 | $1.1 \times 10^{10}$ | 5% |
| 40W | 5 | 95 | 0 | $3.2 \times 10^{11}$ | 14% |
| 40W | 16 | 42 | 42 | $2.4 \times 10^6$ | $3.3 \times 10^{-4}$% |

TABLE 1-continued

| RF power | Composition of film (%) | | | Photo-resistivity [Ωcm] | Optical transmittance (%) at 500 nm |
|---|---|---|---|---|---|
| | C | Si | Ge | | |
| 40W | 20 | 54 | 26 | $7.0 \times 10^7$ | $<10^{-5}\%$ |
| 40W | 60 | 0 | 40 | $1.5 \times 10^4$ | $<10^{-5}\%$ |
| 40W | 0 | 50 | 50 | $5.5 \times 10^7$ | $<10^{-5}\%$ |
| 15W | 62 | 19 | 19 | $4.5 \times 10^{10}$ | 1 |
| 15W | 56 | 18 | 26 | $2.2 \times 10^9$ | $3.3 \times 10^{-4}\%$ |
| 15W | 45 | 14 | 41 | $6.0 \times 10^8$ | $<10^{-5}\%$ |
| 15W | 52 | 16 | 32 | $1.4 \times 10^9$ | $<10^{-5}\%$ |
| 5W | 56 | 18 | 26 | $6.1 \times 10^{10}$ | $3.3 \times 10^{-4}\%$ |

In order to obtain sufficient resolution, resistivity is preferably more than $10^8$ Ωcm, more preferably more than $10^9$ Ωcm. On the other hand, in order to obtain a desired light amplification factor aimed at, light transmittance should be less than 10%, more preferably less than 3%.

It was found from the above results that the content of germanium is important. That is, in order to make the light transmittance less than 10% and less than the content of germanium should be more than 5% and more preferably than 12.5%. Moreover, in order to make the resistivity more than $10^8$ Ωcm, the content of germanium should be less than 45 atm %, the content of silicon should be more than 2.5 atm %, and in order to make the resistivity more than $10^9$ Ωcm, the content of germanium should be less than 35 atm %, the content of silicon should be more than 5 atm %, and the content of carbon should be more than 2.5 atm %.

Next, it was actually proved that the compositions of of the light blocking layer influences both light amplification and resolution of the spatial light modulator.

The results of the actual test are as follows. First, a spatial light modulator 12A was manufactured according to the steps shown in FIGS. 1–5.

A photoconductive layer 1A was formed with a single crystal of $Bi_{12}SiO_{20}$, and its dimension was 35 mm×35 mm×0.5 mm. Transparent electrode films 2A and 2B were formed by a vacuum vapor deposition method.

A light blocking layer 3 was formed by a plasma CVD method. The condition is as follows.

TABLE 2

| Gas source flow rate | |
|---|---|
| $SiH_4$ gas: | 6.5 sccm |
| $GeH_4$ gas: | 1.6 sccm |
| $C_2H_4$ gas: | 29.5 sccm |
| Pressure of gas source: | 100 m torr |
| RF power: | 40 W |
| Substrate temperature: | 100° C. |

The composition of this amorphous film was 62 atomic % of carbon, 19 atomic % of germanium and 19 atomic % of silicon. The composition was determined by means of an Auger electron spectroscope.

A dielectric multilayered film 4 was formed by a vacuum vapor deposition method. The dielectric multilayered film 4 was a layered body of a $TiO_2$ thin film and an $SiO_2$ thin film, twenty layers of which were alternately layered.

A PDLC film was constructed with the following material to obtain a light modulating layer 8.

TABLE 3

| Nematic liquid crystal | |
|---|---|
| Mixed liquid crystal of cyanobiphenyl | |
| Ordinary refractive index $n_o = 1.525$ | |
| Extraordinary refractive index $n_e = 1.748$ | |
| Relative dielectric constant in a parallel direction of major axis of liquid crystal molecule $\epsilon_{11} = 17.6$ | |
| Relative dielectric constant in a perpendicular direction of major axis of liquid crystal molecule $\epsilon_\perp = 5.1$ | |
| Ultraviolet ray curable polymer | |
| Urethane polymer | |
| Refractive index $n_p = 1.524$ | |
| Wavelength range of ultraviolet ray | 350–380 nm |
| Spherical spacer agent | |
| Cured resin | |
| Diameter | 18 μm |

The spatial light modulator 12A was incorporated in the optical system shown in FIG. 6 and examined. Moreover, in order to display a color moving picture image, three modulators of 12A were formed and assembled in the optical system of FIG. 12, respectively.

That is, the same spatial light modulator 20B, 20R and 20G as the above modulator 12A were manufactured, and incorporated in the optical system of FIG. 12. In the optical system of FIG. 12, three blue lights are modulated by liquid crystal panels 21B, 21R and 21G, respectively, and each write-in light is obtained. Each write-in light passes through lenses 22B, 22R and 22G, respectively, and enters into the spatial light modulator 20B, 20R and 20G. Then, the write-in step into each modulator is carried out. On the other hand, the white light excited from a white light source 23 is focussed on a mirror 25. In the reflected light, the blue light is reflected by a dichroic mirror 26B, and illuminates the modulator 20B. The visible light other than the blue light transmits through the dichroic mirror 26B. Then, the red light is reflected by a dichroic mirror 26R, and illuminates the modulator 20R. The green light transmits through the dichroic mirror 26R, and illuminates the modulator 20G.

Each primary color light passed through a light modulation layer 8, is mainly reflected by a dielectric multilayered film 4, again passes through the light modulation layer 8, and is projected on a screen 27 through lenses 24B and 24C. Thus, a full color image is formed.

A driving voltage of the spatial light modulator was 50 $V_{rms}$, it driving frequency was 30 Hz, a wavelength of the write-in light was 380–490 nm, and a wavelength of the read-out light was 400–490 nm.

As a result, a write-in light intensity of 300 μJ/cm² and a read-out light intensity of 0.3 J/cm² were achieved, and a light amplification factor was $1 \times 10^3$. Moreover, a resolution in this case was 30 lp/mm.

Moreover, another spatial light modulator with a light blocking layer was manufactured in the same manner as above. The light blocking layer was formed by the following condition.

TABLE 4

| $SiH_4$ gas | 6.5 sccm |
|---|---|
| $GeH_4$ gas | 1.6 sccm |
| $CH_4$ gas | 40 sccm |
| Gas source pressure | 50 m torr |
| RF power | 20 W |
| Film thickness | 3 μm |

The composition of the obtained amorphous film was 40% of carbon, 50% of germanium and 10% of silicon. When this spatial light modulator was operated as above, a picture image was very obscure, and a resolution of only 3 lp/mm was obtained.

Moreover, another spatial light modulator having a different light blocking layer was manufactured in the same manner as above. The light blocking layer was formed by the following conditions.

TABLE 5

| | |
|---|---|
| $SiH_2$ gas | 0.7 sccm |
| $CH_4$ gas | 4.3 sccm |
| $H_2$ gas | 50 sccm |
| Gas source pressure | 200 m torr |
| RF power | 200 W |
| Film thickness | 1 μm |

The composition of the obtained amorphous film was 5 atm % of carbon, 0 atm % of germanium and 95 atm % of silicon. When this spatial light modulator was operated as above, the read-out light of more than 500 μJ/cm$^2$ and 50 μJ/cm$^2$ of write-in light were achieved and the contrast ratio of displayed image was considerably lowered due to the light leaked to a photoconductive layer, so that it was impossible to increase the read-out light intensity any higher. The light amplification factor was about 10, and when an image was projected to a large screen, it was dark.

The composition of an amorphous film for constructing a light blocking layer was variously changed, and light amplification factor and resolution of a spatial light modulator were measured in the same manner as stated above. Measured results are shown together with the already described results.

TABLE 6

| Compositions of films (%) | | | Signal amplification factor | Resolution |
|---|---|---|---|---|
| C | Si | Ge | | |
| 5 | 95 | 0 | 10 | 32 lp/mm |
| 64 | 32 | 4 | 10 | 32 lp/mm |
| 63 | 31 | 6 | 30 | 30 lp/mm |
| 59 | 30 | 11 | 30 | 30 lp/mm |
| 57 | 29 | 14 | $10^2$ | 30 lp/mm |
| 62 | 19 | 19 | $10^2$ | 30 lp/mm |
| 50 | 16 | 34 | $3 \times 10^3$ | 20 lp/mm |
| 49 | 15 | 36 | $3 \times 10^3$ | 16 lp/mm |
| 42 | 14 | 44 | $3 \times 10^3$ | 16 lp/mm |
| 40 | 14 | 46 | $>10^4$ | <5 lp/mm |
| 40 | 10 | 50 | — | 3 lp/mm |

As apparent from the above results, when an amount of germanium is 5–45 atom %, the signal amplification factor and the resolution of a spatial light modulator are good. Particularly, when the amount of germanium is 14 atom %, 19 atom % and 34 atom %, the highest property was obtained. In case of 4 atom % of germanium, even if the signal amplification factor was increased to more than 10, the resolution was extremely deteriorated. In case of 6 atom % of germanium, a comparatively bright image was obtained. In case of 44 atom % of germanium, a bright image having a relatively clear contour was obtained. When an amount of germanium exceeded 46 atom %, an obscure blurred image was only obtained.

Discussion:

The present invention provides a light blocking layer between a photoconductive layer and a dielectric multilayered film, and forms the light blocking layer with an amorphous film consisting of the above composition, so as to absorb effectively the read-out light passed through the dielectric multilayered film. Therefore, even if an intensity of the read-out light is increased, the read-out light hardly leaks to the side of the photoconductive layer, and the sensitization of the photoconductive layer due to the leakage of read-out light is hardly caused. Thereby, the magnification factor of the intensity of read-out light to the intensity of write-in light can be increased.

Moreover, when an amorphous film consisting of the above composition is used, even if a part of read-out light is absorbed, resolution of the spatial light modulator is not deteriorated, so that both the intensity and the resolution of read-out light can be increased.

EXAMPLE 2

A process for manufacturing a spatial light modulator 12A relating to an embodiment of the present invention is successively explained by referring to FIGS. 1–5. In the present embodiment, as a photoconductive layer 1A, use is made of a single crystal selected from $Bi_{12}SiO_{20}$ single crystal or $Bi_{12}GeO_{20}$ single crystal.

First, a photoconductive layer 1A consisting of these single crystals is cut from a single crystal wafer, and one transparent electrode film 2A is provided on one surface of the photoconductive layer 1A (FIG. 1).

Second, as shown in FIG. 2, a light blocking layer 3 is provided on the other surface of the photoconductive layer 1A according to the present invention as shown in FIG. 2. The construction and the method of manufacturing of the light blocking layer 3 will be explained later on.

Third, as shown in FIG. 3, a dielectric multilayered film 4 is provided by deposition on the surface of the light blocking layer 3.

On the other hand, as shown in FIG. 4, the other transparent electrode film 2B is formed on the surface of a glass substrate 7. The dielectric multilayered film 4 and the transparent electrode film 2B are opposed to each other by sandwiching a seal member 5 containing spacers. A flat plate-shaped space 6 is formed between the dielectric multilayered film 4, the transparent electrode film 2B and the seal member 5.

In the present embodiment, a polymer-dispersed liquid crystal (PDLC) as liquid crystal material is made by dispersing liquid crystal droplets particles in a transparent polymer film. As an actual method of manufacturing, a mixture of non-cured nematic liquid crystal and resin matrix is injected from an injection hole in the same manner as the conventional twist nematic liquid crystal, the injection hole is sealed and thereafter the mixture was cured. As a result, a light modulation layer 8 consisting of PDLC is formed within the space 6 as shown in FIG. 5.

There is another manufacturing method without using any seal member.

That is, for example, a mixture of non-cured nematic liquid crystal and resin matrix is supplied onto a substrate provided with a transparent electrode, thereafter a photoconductive layer adhering a dielectric multilayered film and a transparent electrode thereto is layered and cured by irradiation and the like. It is of course preferable to apply a seal member in the circumference and the circumference is sealed thereafter. According to this manufacturing method, a mixture of non-cured nematic liquid crystal and resin matrix is simply supplied by application by means of roll coat, spin coat, printing and dispenser, so that the injection step is simple and the productivity is extremely high.

Moreover, to the mixture of non-cured nematic liquid crystal and resin matrix can be added ceramic particles and plastic particles for controlling a substrate gasp, spacer such as glass fiber and the like, pigment, dye, viscosity modifier, and other additives giving no bad influence upon performance of liquid crystal.

The behavior of the spatial light modulator is then explained by referring to a schematic diagram of projector of FIG. 6. The write-in light illuminated from a light source 10A of weak write-in light becomes input image light by passing through a liquid crystal television 11, and this input image light is condensed by a lens 13a and irradiated to a spatial light modulator 12A. This input image light passes through a transparent electrode film 2A and is incident upon a photoconductive layer 1A. On the other hand, read-out light emitted from a light source 10B of read-out light having high luminance is condensed by a lens 13B, reflected by a mirror 25, regulated by a lens 13C and is incident upon an optical modulation layer 8.

This incident light is mainly reflected by a dielectric multilayered film 4, passed through the light modulation layer 8 once more, condensed by the lens 13C and projected onto a screen 14 by passing through a lens 13D.

The write-in light is shaded by the liquid crystal television 11. At the portion where no light is incident on the photoconductive layer 1A, almost voltage is applied along the photoconductive layer 1A. Therefore, a voltage applied to the light modulation layer 8 does not reach a threshold voltage of the light modulation layer 8. On the other hand, when the light is applied to the photoconductive layer 1A, the electric resistance of the photoconductive layer 1A is largely lowered at that portion, and the voltage applied along the light modulation layer 8 is increased to exceed the threshold value.

When a voltage is not applied to a light modulation layer 8, liquid crystal molecules are aligned along the interface between a polymer and a liquid crystal in the inside of the light modulation layer 8 consisting of PDLC. The shape of a liquid crystal droplet is irregular. When a voltage applied to the light modulation layer 8 is low, refractive indices of the liquid crystal droplet and the polymer are largely different from each other, so that the read-out light often changes its running direction within the light modulation layer 8 and scatters. On the other hand, when the voltage applied to the light modulation layer 8 exceeds the threshold voltage and the liquid crystal molecule is oriented to the direction of an electric field, the read-out light passes through the light modulation layer 8 without scattering.

With the above mechanism, two-dimensional image information having the write-in light is transferred to the read-out light. If intensity of the read-out light is larger than that of the write-in light, the signal amplification factor becomes higher.

As described above, the dielectric multilayered film 4 reflects only 90–99% of the read-out light. Therefore, a part of the read-out light passes through the dielectric multilayered film 4 and incident upon the photoconductive layer 1A. The stronger the intensity of the read-out light becomes, the stronger the light is incident upon the photoconductive layer 1A as described above, and the photoconductive layer 1A is sensitized.

Therefore, in the present embodiment, it is necessary to insert a light blocking layer 3 between a photoconductive layer 1A and a dielectric multilayered film 4 for blocking read-out light leaked from the dielectric multilayered film 4. Here, the light blocking layer is constructed with an amorphous film consisting of at least one element selected from the group consisting essentially of silicon, germanium and carbon. "Consisting essentially of" means that inevitable impurities contained therein can be permitted. The present inventor has discovered that the read-out light passed through the dielectric film 4 can be absorbed by using such amorphous film as a light blocking layer 3. Thereby, it becomes possible to increase an intensity of read-out light.

It was further understood that if the above amorphous film is used, even if the read-out light is absorbed, the deterioration of resolution of a spatial light modulator is extremely small. This is because even if the amorphous film absorbs light, the lowering of its resistivity is very small.

The above amorphous film is preferably manufactured by a CVD method. Because the composition of an amorphous film can suitably be changed by changing the flow rate of each kind of gas sources.

An embodiment of forming the photoconductive layer with a hydrogenated amorphous silicon film will be explained by referring to FIGS. 7–9. First, as shown in FIG. 7, one transparent electrode film 2A is provided on a glass substrate 17 which surface is polished smoothly.

As shown in FIG. 8, a photoconductive layer 1B consisting of a hydrogenated amorphous silicon film is provided on the surface of one transparent electrode film 2A and a light shielding layer 3 is provided on the surface of the photoconductive layer 1B. Thereafter, according to the steps explained in FIGS. 3, 4 and 5, a dielectric multilayered film 4, a light modulation layer 8, the other transparent electrode film 2B and a glass substrate 7 are successively provided. Thus, a spatial light modulator 12B shown in FIG. 9 is obtained.

A photoconductive layer 1B consisting of a hydrogenated amorphous silicon film is preferably formed by plasma CVD method. In this case, as described above, if a light blocking layer 3 is formed by plasma CVD, a photoconductive layer 1B and a light blocking layer 3 are continuously formed on a transparent electrode film 2A within the same device by plasma CVD method. It is a matter of course in this case that gas source should suitably be changed. The behavior of a spatial light modulator 12B is the same as that of the above described modulator 12A.

An actual test result will be explained next. First, a spatial light modulator 12A was manufactured by the steps shown in FIGS. 1–5.

However, a photoconductive layer 1A was formed with $Bi_{12}SiO_{20}$ single crystal, and its dimension was 35 mm×35 mm×0.5 mm. Transparent electrode films 2A and 2B were formed by a plasma CVD method.

A light blocking layer 3 was formed by a plasma CVD method. The condition is as follows.

TABLE 7

| | |
|---|---|
| $SiH_4$ gas | 6.5 sccm |
| $GeH_4$ gas | 1.6 sccm |
| $C_2H_4$ gas | 29.5 sccm |
| Pressure of gas source | 100 m torr |
| RF power | 40 W |
| Substrate temperature | 100° C. |
| Film thickness | 1 μm |

Light transmission of the thus obtained amorphous film (light blocking layer 3) was measured by a spectrophotometer and it was 3.5% in wavelength 500 nm. Moreover, the resistivity was measured by a two terminal probe method with the use of an ammeter as an oscillator, and it was $10^8$ Ω.cm.

A composition of the amorphous film was as follows.

TABLE 8

| Ge | 4 atom % |
|----|----------|
| C  | 70 atom % |
| Si | 26 atom % |

A dielectric multilayered film 4 was formed by a vacuum vapor deposition method. The dielectric multilayered film 4 was a layered body of a $TiO_2$ thin film and an $SiO_2$ thin film, twenty layers of which were alternately layered.

A PDLC film was constructed with the following material to obtain a light modulation layer 8 having thickness of 18 μm.

TABLE 9

| Cyanobiphenyl nematic liquid crystal |
|---|
| Ordinary refractive index $n_o = 1.525$ |
| Extraordinary refractive index $n_e = 1.748$ |
| Relative dielectric constant in a parallel direction of major axis of liquid crystal molecule $\epsilon_{11} = 17.6$ |
| Relative dielectric constant in a perpendicular direction of a major axis of liquid crystal molecule $\epsilon_1 = 5.1$ |
| Ultraviolet ray curable polymer |
| Urethane polymer |
| Refractive index $n_p = 1.524$ |
| Wavelength range of ultraviolent ray . . . 350–280 nm |
| Spherical spacer agent |
| Cured resin |
| Diameter . . . 18 μm |

The spatial light modulator 12A was incorporated in the optical system shown in FIG. 6 and examined. Moreover, in order to display color moving picture image, three modulators of 12A were formed and assembled in the optical system of FIG. 12, respectively.

That is, the same spatial light modulator 20B, 20R and 20G as the above modulator 12A were manufactured, and incorporated in the optical system of FIG. 12. In the optical system of FIG. 12, three blue lights are modulated by liquid crystal panels 21B, 21R and 21G, respectively, and each write-in light is obtained. Each write-in light passes through lenses 22B, 22R and 22G, respectively, and enter into the spatial light modulators 20B, 20R and 20G. Then, the write-in light into each modulator element is carried out. On the other hand, the white light exited from a white light source 23 is focussed on a mirror 25. In the reflected light, the blue light is reflected by a dichronic mirror 26B, and illuminates the modulator 20B. Visible light other than the blue light transmits through the dichronic mirror 26B. Then, the red light is reflected by a dichroic mirror 26R, and illuminates the modulator 20R. The green light transmits through the dichroic mirror 26R, and illuminates the modulator 20G.

Each primary color light passes through an light modulation layer 8, is mainly reflected by a dielectric multilayered film 4, again passes through the light modulation layer 8, and is projected on a screen 27 through lenses 24B and 24C. Thus, a full color image is formed.

A driving voltage of the spatial light modulator element was 50 $V_{rms}$, its driving frequency was 30 Hz, a wavelength of the write-in light was 380–490 nm, and a wavelength of the read-out light was 400–490 nm.

As a result, a write-in light intensity of 300 μJ/cm$^2$ and a read-out light intensity of 0.3 μJ/cm$^2$ were achieved. The ratio of these values is 1000. As a result, light is projected to a screen of 110 inch diagonal and sufficiently viewed even in a bright room. The resolution of this spatial light modulator was 30 lp/mm which corresponded to 1000×1000 pixels as a number of pixels, which was sufficient for a high-definition display.

On the other hand, as a comparative example, a spatial light modulator having no light blocking layer 3 was manufactured. This element was manufactured in the same manner as in the above embodiment, except that a light blocking element is not provided. However, a thickness of the photoconductive layer 1A was made 0.35 mm. Intensities and resolutions of the write-in light and the read-out light were measured in the same manner as above. However, the read-out light intensity was made 2 m W/cm$^2$.

Dependence of light amplification factor (i.e read-out light intensity/write-in light intensity) on resolution was obtained and the result thereof was shown in FIG. 13 as a graph.

As understood from the graph of FIG. 13, even if a dielectric multilayered film having high reflectivity as described above is used, input-output light properties are changed because of light scattering properties of PDLC. Therefore, when the resolution is increased, the signal amplification factor is rapidly decreased. As apparent from such test result, the spatial light modulator having no light blocking layer 3 cannot enlarge and project an image having high resolution onto a large screen.

A spatial light modulator 12B was manufactured according to the steps explained by referring to FIGS. 7–9. However, the method of forming each element was the same as that in the above embodiment. Moreover, a hydrogenated amorphous silicon film (i.e photoconductive layer 1B) was formed by a plasma CVD method. The condition in this case was as follows.

TABLE 10

| Gas source: | |
|---|---|
| GeH$_2$ gas | 1.5 sccm |
| SiH$_4$ gas | 2.5 sccm |
| H$_2$ gas | 500 sccm |
| Pressure of gas source: | 3 torr |
| RF power: | 50 W |
| Substrate temperature: | 200° C. |
| Film thickness: | 10 μm |

In the case of forming a light blocking layer 3, a film was formed by changing gas source within the same device for forming the photoconductive layer 1B. The same test as the above was conducted on the thus obtained spatial light modulator 12B.

As a result, write-in light intensity of 50 μJ/cm$^2$ and read-out light intensity of 100 mJ/cm$^2$ were materialized. Moreover, resolution of the spatial light modulator 12B was 50 lP/mm, and high resolution was obtained.

Discussion:

According to Example 2, a light blocking layer is provided between a photoconductive layer and a dielectric multilayered film, and the light blocking layer is formed with the above amorphous film, so that read-out light passed through the dielectric multilayered film can effectively be absorbed. Therefore, even if the intensity of read-out light is increased, the read-out light hardly leaks to the side of the photoconductive layer, and the photoconductive layer is hardly sensitized by leakage of read-out light.

Moreover, when the above amorphous film is used, even if a part of read-out light is absorbed, the resolution of the spatial light modulator is not deteriorated, so that the resolution can be increased as the intensity of read-out light is increased.

EXAMPLE 3

A process for manufacturing a spatial light modulator 12A relating to an embodiment of the present invention is successively explained by referring to FIGS. 1–5. In the present embodiment, as a photoconductive layer 1A, use is made of a single crystal selected from $Bi_{12}SiO_{20}$ single crystal or $Bi_{12}GeO_{20}$ single crystal or GaAs single crystal.

First, a photoconductive layer 1A consisting of these single crystals is cut from a single crystal wafer, and one transparent electrode film 2A is provided on one surface of the photoconductive layer 1A (FIG. 1).

Second, as shown in FIG. 2, a light blocking layer 3 is provided on the other surface of the photoconductive layer 1A according to the present invention as shown in FIG. 2. The construction and the method of manufacturing of the light blocking layer 3 will be explained later on.

Third, as shown in FIG. 3, a dielectric multilayered film 4 is provided by deposition on the surface of the light blocking layer 3.

On the other hand, as shown in FIG. 4, the other transparent electrode film 2B is formed on the surface of a glass substrate 7. The dielectric multilayered film 4 and the transparent electrode film 2B are opposed to each other by sandwiching a seal member 5 containing spacers. A flat plate-shaped space 6 is formed between the dielectric multilayered film 4, the transparent electrode film 2B and the seal member 5.

In the present embodiment, polymer-dispersed liquid crystal (PDLC) as liquid crystal material is made by dispersing liquid crystal droplets in a transparent polymer. As an actual method of manufacturing, a mixture of non-cured nematic liquid crystal and resin matrix is injected from an injection hole in the same manner as the conventional twist nematic liquid crystal, the injection hole is sealed and thereafter the mixture was cured. As a result, a light modulation layer 8 consisting of PDLC is formed within the space 6 as shown in FIG. 5.

There is another manufacturing method without using any seal member.

That is, for example, a mixture of non-cured nematic liquid crystal and resin matrix is supplied onto a substrate provided with a transparent electrode, thereafter a photoconductive layer adhering a dielectric multilayered film and a transparent electrode thereto is layered and cured by irradiation and the like. It is of course preferable to apply a seal member in the circumference and the circumference is sealed thereafter. According to this manufacturing method, a mixture of non-cured nematic liquid crystal and resin matrix is simply supplied by application by means of roll coat, spin coat, printing and dispenser, so that the injection step is simple and the productivity is extremely high.

Moreover, to the mixture of non-cured nematic liquid crystal and resin matrix can be added ceramic particles and plastic particles for controlling a substrate gasp, spacer such as glass fiber and the like, pigment, dye, viscosity modifier, and other additives giving no bad influence upon performance of liquid crystal.

The behavior of the spatial light modulator is then explained by referring to a schematic diagram of projector of FIG. 6. The write-in light illuminated from a light source 10A of weak write-in light becomes input image light by passing through a liquid crystal television 11, and this input image light is condensed by a lens 13a and irradiated to a spatial light modulator 12A. This input image light passes through a transparent electrode film 2A and is incident upon a photoconductive layer 1A. On the other hand, read-out light emitted from a light source 10B of read-out light having high luminance is condensed by a lens 13B, reflected by a mirror 25, regulated by a lens 13C and is incident upon a light modulation layer 8.

This incident light is mainly reflected by a dielectric multilayered film 4, passed through the light modulation layer 8 once more, condensed by the lens 13C and projected onto a screen 14 by passing through a lens 13D.

The write-in light is shaded by the liquid crystal television 11. At the portion where no light is incident upon the photoconductive layer 1A, almost voltage applied along the photoconductive layer 1A. Therefore, a voltage applied to the light modulation layer 8 does not reach a threshold voltage of the light modulation layer 8. On the other hand, when the light is incident upon the photoconductivity layer 1A, the electric resistance of the photoconductive layer 1A is largely lowered at that portion, and the voltage applied along the light modulation layer 8 is increased to exceed the threshold value.

When a voltage is not applied to an light modulation layer 8, liquid crystal molecules are aligned along the interface between a polymer and a liquid crystal in the inside of the light modulation layer 8 consisting of PDLC. The shape of a liquid crystal droplet is irregular. When a voltage applied to the light modulation layer 8 is low, refractive indexes of the liquid crystal droplet and the polymer are largely different from each other, so that the read-out light often changes its running direction within the light modulation layer 8 and scatters. On the other hand, when the voltage applied to the light modulation layer 8 exceeds the threshold voltage and the liquid crystal molecules are oriented to the direction of an electric field, the read-out light passes through the light modulation layer 8 without scattering.

With the above mechanism, two-dimensional image information having the write-in light is transferred to the read-out light. If intensity of the read-out light is larger than that of the write-in light, the signal amplification factor becomes higher.

As described above, the dielectric multilayered film 4 reflects only 90–99% of the read-out light. Therefore, a part of the read-out light exceeds the dielectric multilayered film 4 and leaks to the photoconductive layer 1A. The stronger the intensity of the read-out light becomes, the more stronger the light incident upon the photoconductive layer 1A as described above, and the photoconductive layer 1A is sensitized.

Therefore, in order to increase a signal amplification factor, it is necessary to provide a light blocking layer 3 for blocking the read-out light passed through the dielectric multilayered film 4 between the photoconductive layer 1A and the dielectric multilayered film 4. However, conflicting properties are required for the light blocking layer 3. That is, the light blocking layer 3 should have high light absorption coefficient, thereby enabling to increase the intensity of the read-out light. However, the light blocking layer having the high read-out light absorption coefficient usually lowers its resistivity when light is absorbed. In such a case, the resolution of the spatial light modulator is rapidly deteriorated, and a projected image becomes unclear and blurred.

The present inventors have solved the above shortcoming of antimony, and discovered a new light blocking layer which can increase the intensity of the read-out light and can prevent the resolution of modulator from deteriorating. Thus, it becomes possible to obtain bright projected image having the high resolution.

The light blocking layer used in the present invention is a hydrogenated amorphous silicon film having the resistivity of $10^8$ Ωcm to $10^{10}$ Ωcm and the light absorption coefficient of $10^4$ cm$^{-1}$ to $10^5$ cm$^{-1}$ at the wavelength of 600 nm, regardless with whether the irradiated light exist or not.

If a resistivity is lower than $10^8$ Ωcm at the bright portion of a hydrogenated amorphous silicon film, the resolution of the element is deteriorated. Moreover, if a light absorption coefficient of the film is lower than $10^4$ cm$^{-1}$, the luminous energy passing through the light blocking layer 3 is increased, so that a projected image cannot be brightened. Moreover, viewed from properties of projected image, the higher the light absorption coefficient of the hydrogenated amorphous silicon film and the photo-resistivity, the better the resolution of the element is. However, in the amorphous film, the more the light is absorbed by the film, the lower the resistivity at the bright portion becomes. Moreover, the film having the high resistivity at the bright portion usually has small light absorption coefficient. Thus, the light absorption coefficient and the resistivity at the bright portion are opposed to each other, so that it is difficult to increase both. In the prior hydrogenated amorphous silicon film, from the physical properties thereof, if the light absorption coefficient is within the above range, the resistivity of $10^5$ Ωcm is a limit in manufacture, and if the resistivity is within the above range, the light absorption coefficient of $10^4$ cm$^{-1}$ is a limit in manufacture. If the resistivity at the bright portion exceeds $10^{10}$ Ωcm, it is difficult to maintain the light absorption coefficient to more than $10^4$ cm$^{-1}$, and if the light absorption coefficient exceeds $10^5$ cm$^{-1}$, it is difficult to maintain the resistivity at the bright point to more than $10^8$ Ωcm.

A method of providing the above hydrogenated amorphous silicon film on the surface of a photoconductive layer is explained. The film is formed with the use of a monosilane gas as gas source at a temperature of a substrate kept at less than 120° C. by a plasma CVD method.

Generally, the hydrogenated amorphous silicon film is used as a photoconductive layer or sensitized body. In such photoconductive layer, it is necessary to increase the light absorption coefficient, i.e., light sensitivity. It is further necessary to lower quickly the resistivity as soon as light is absorbed at the same time. Therefore, any defect of the film should be lessened, and the denser film as possible should be adhered. From such demand, the hydrogenated amorphous silicon film is formed at a temperature of more than 200° C.

When such prior hydrogenated amorphous silicon film is used as a light blocking layer of the spatial light modulator, the resistivity of the film is rapidly lowered by irradiating light, so as to deteriorate considerably the resolution of the modulator. Therefore, the present invention has started from the directly opposite idea to the prior art, introduced a moderate defect into a hydrogenated amorphous silicon film, and formed the hydrogenated amorphous silicon film having moderate light absorbability and moderate resistivity. That is, the present invention succeeded to provide the above hydrogenated amorphous silicon film on the surface of a photoconductive layer by maintaining a temperature of a substrate at less than 120° C. by a plasma CVD method.

It was also understood that the light blocking layer of the present invention can be obtained even by forming a hydrogenated amorphous silicon film with the use of a monosilane gas by a plasma CVD method by maintaining a temperature of a substrate at less than 100° C., and by annealing this film at a temperature of less than 120° C. and more than 100° C. According to this method, even with the above processing, properties of the hydrogenated amorphous silicon film are not deteriorated, the surface of the film becomes smooth by this heat processing, and a dielectric multilayered film is easily deposited on the surface of the light blocking layer. When the temperature of this processing exceeds 120° C., the density of the hydrogenated amorphous silicon film increases, and the specific resistivity is far lowered by irradiating light.

An embodiment of using a hydrogenated amorphous silicon film and a hydrogenated amorphous silicon carbide film as the photoconductive layer is explained by referring to FIGS. 7–9. First, as shown in FIG. 7, one transparent electrode film 2A is provided on a glass substrate 17 which surface is polished smoothly.

As shown in FIG. 8, a photoconductive layer 1B consisting of a hydrogenated amorphous silicon film is provided on the surface of one transparent electrode film 2A, and a light blocking layer 3 is provided on the surface of the photoconductive layer 1B. Thereafter, according to the steps explained in FIGS. 3, 4, and 5, a dielectric multilayered film 4, a light modulation layer 8, the other transparent electrode film 2B and a glass substrate 7 are successively provided. Thus, a spatial light modulator 12B shown in FIG. 9 is obtained.

A photoconductive layer 1B consisting of a hydrogenated amorphous silicon film is preferably formed by a plasma CVD method. In this case, as described above, if a light blocking layer 3 is formed by a plasma CVD method, a photoconductive layer 1B and a light blocking layer 3 are continuously formed on a transparent electrode film 2A within the same device by a plasma CVD method. It is a matter of course in this case that gas source should suitably be changed. The behavior of a spatial light modulator 12B is the same as that of the above described modulator 12A.

The actual test result is explained as follows. First, a spatial light modulator 12A was manufactured by the steps shown in FIGS. 1–5

However, a photoconductive layer 1A was formed with a $Bi_{12}SiO_{20}$ single crystal, and its dimension was 35 mm×35 mm×0.5 mm. Transparent electrode films 2A and 2B are formed by a vacuum vapor deposition method.

A light blocking layer 3 was formed by a plasma CVD method. The condition is as follows.

Device used: Shimazu PCVO-25 type

Gas source: flow rate 5 sccm of $SiH_4$ gas

Pressure of gas source: 25 m torr

RF power: 100 W

Substrate temperature: 50° C.

Deposition time: 2 hours

Film thickness: 0.6 μm

A light absorption coefficient of the obtained amorphous film (i.e light blocking layer 3) was measured and it was $4.3×10^4$ cm$^{-1}$ at the wavelength of 600 nm. Resistivity was measured by a two terminal probe method and the following values were obtained.

$3.8 \times 10^9$ Ω.cm (dark resistivity)

$3.0 \times 10^8$ Ω.cm (photo-resistivity)

A dielectric multilayered film 4 was formed by a vacuum deposition method. The dielectric multilayered film 4 was a laminated body of a $TiO_2$ thin film and an $SiO_2$ film, twenty layers of which were alternately laminated.

A PDLC film was formed with the following materials and a light modulator layer 8 of 18 μm in thickness was obtained.

Nematic liquid crystal
Mixed liquid crystal of cyanobiphenyl
Ordinary refractive index $n_o=1,525$
Extraordinary refractive index $n_e=1.748$
Relative dielectric constant in a parallel direction of major axis of liquid crystal molecule $\epsilon_{11}=17.6$
Relative dielectric constant in a perpendicular direction of major axis of liquid crystal molecule $\epsilon_\perp=5.1$
Ultraviolet ray cured polymer
Urethane polymer
Refractive index $n_p=1.524$
Wavelength range of ultraviolet ray . . . 350–380 nm
Spherical spacer agent
Cured resin
Diameter . . . 18 μm The spatial light modulator 12A was incorporated in the optical system shown in FIG. 6 and examined. Moreover, in order to display color moving image, three of the above element 12A were manufactured and incorporated in the optical system shown in FIG. 12.

That is, the same spatial light modulators 20B, 20r and 20G as those of the above element 12A were manufactured and incorporated in the optical system of FIG. 12, respectively. In the optical system of FIG. 12, three blue lights are modulated by liquid crystal panels 21B, 21R and 21G, respectively, and each read-out light is obtained. Each read-out light passes through lenses 22B, 22R and 22G, respectively, and illuminates the spatial light modulator elements 20B, 20R and 20G. Thereby, the write-in step is carried out in each element. On the other hand, the white light emitted from a white light source 23 is focussed on a mirror 25 by a lens 24A. In the reflected light, the blue light is reflected by a dichroic mirror 26B, and incident upon the element 20B. The visible light other than blue light passes through the dichroic mirror 26B. Then, the red light is reflected by the dichronic mirror 26R, and incident upon the element 20R. The green light passes through the dichroic mirror 26R, and incident upon the element 20G.

Each primary color light passed through a light modulator layer 8, is mainly reflected by a dielectric multilayered film 4, again passes through the light modulator layer 8, and is projected on a screen 27 through lenses 24B and 24C. Thus a full color image is formed.

As a result, a write-in light intensity of 300 μJ/cm² and a read-out light intensity of 0.3 J/cm² were achieved. Therefore, the ratio of these values is 1000, and large signal amplification factor is obtained. As a result, the light was projected on a screen of 110-inch diagonal length and sufficiently viewed even in a bright room. The resolution of this system was 30 lp/mm, which corresponded to 1000× 1000 pixel as a number of pixels, which was sufficient for a high-definition display.

In the above test, after the hydrogenated amorphous silicon film was formed on the surface of the photoconductive layer, it was annealed in vacuo under the following condition.

Temperature 120° C.
atmospheric pressure: $8.7 \times 10^{-7}$ torr
time: 2 hours A light absorption coefficient of the hydrogenated amorphous silicon film, the dark resistivity, and the photo-resistivity were $4.3 \times 10^4$ cm⁻¹, $1.5 \times 10^{10}$ Ω.cm, $3.8 \times 10^8$ Ω.cm, respectively. Moreover, when a spatial light modulator was manufactured in the same manner as above, the same or more resolution than the above embodiment was obtained. The read-out light intensity was rather smaller than the above embodiment, that is, 0.1 J/cm².

In the above test embodiment, a hydrogenated amorphous silicon film was formed in the same manner as above, except that a substrate temperature was 200° C., and the film having the following properties was obtained.

Light absorption coefficient: $4.0 \times 10^4$ cm⁻¹, dark resistivity: $5.0 \times 10^9$ Ω.cm, photo-resistivity: $3.0 \times 10^6$ Ω.cm, and film thickness: 0.8 μm.

When the other spatial light modulator was manufactured in the same manner as above, that write-in light intensity was 300 μJ/Cm², while the read-out light intensity was 0.1 J/cm². Moreover, the resolution was 10 lp/mm on the spatial light modulator.

In the above test embodiment, two kinds of spatial light modulators were manufactured by changing gas source forming a light blocking layer and its flow rate so as to change properties of the light blocking layer. The film forming conditions of each sample and characteristic values thereof are shown in the following Table 11. Comparative samples 1 and 2 of the spatial light modulators were manufactured in the same manner as above, except the light blocking layer 3.

TABLE 11

| Sample | 1 | | 2 | |
|---|---|---|---|---|
| Gas flow rate [sccm] | SiH₄ | 8 | SiH₄ | 4.3 |
| | GeH₄ | 4 | CH₄ | 0.7 |
| | | | H₂ | 50 |
| Pressure [mTorr] | 25 | | 200 | |
| RF power [W] | 5 | | 100 | |
| Substrate temperature [°C.] | 200 | | 200 | |
| Deposition time [hour] | 4 | | 3 | |
| Film thickness [μm] | 1 | | 10 | |
| Resistivity (dark) | $2.3 \times 10^7$ | | $5.2 \times 10^{10}$ | |
| (photo) [Ωcm] | $7.0 \times 10^6$ | | $3.2 \times 10^{10}$ | |
| Light absorption coefficient [cm⁻¹] | $1.0 \times 10^5$ | | $2.6 \times 10^3$ | |

In the sample 1 shown in Table 11, an a-SiGe:H film was manufactured. The resistivity of the film was lowered by adding germanium. In the sample 2, an a-SiC:H film was manufactured. A light absorption coefficient at the wavelength of 600 nm was lowered by adding carbon.

When image was projected by the sample 1, the resolution was only 10 lp/mm. (signal amplification factor in this case was 10³ times.) Moreover, when image was projected by the sample 2, the signal amplification factor was over 10³.

Discussion:

According to this example, a light blocking layer provided between a photoconductive layer and a dielectric multilayered film is formed with an amorphous film of the above properties, so that read-out light passed through the dielectric multilayered film can effectively be absorbed. Therefore, even if the intensity of read-out light is increased, the read-out light hardly leaks to the side of the photoconductive layer, and the photoconductive layer is hardly sensitized by leakage of read-out light. Thus, signal magnification factor which is the ratio of the intensity of read-out light to the intensity of write-in light can be increased.

Moreover, when the amorphous film of the above properties is used, even if a part of read-out light is absorbed, the resolution of the spatial light modulator cannot be deteriorated, so that the intensity of read-out light can be increased while resolution thereof is increased.

As described above, a single crystal such as the $Bi_{12}SiO_{20}$, $Bi_{12}GeO_{20}$, GaAs are used as photoconductive layer, it is possible by using a hydrogenated amorphous silicon this film, amorphous selen thin film, GaAs thin film etc. as photoconductor layer.

What is claimed is:

1. A spatial light modulator element comprising: at least one photoconductive layer, a first transparent electrode film, provided on one surface of the photoconductive layer, a light blocking layer provided on the other surface of the photoconductive layer, a dielectric multilayered film provided on the light blocking layer, a light modulation layer provided on the dielectric multilayered film, and a second transparent electrode film, provided on the light modulation layer, said light modulation layer consisting of a liquid crystal material for changing intensity, phase or running direction of read-out light, wherein the light blocking layer is an amorphous film consisting essentially of 5–45 atomic % of germanium, 17.5–92.5 atomic % of carbon and 2.5–77.5 atomic % of silicon.

2. A spatial light modulator as defined in claim 1, wherein the light blocking layer is an amorphous film consisting essentially of 12.5–35 atomic % of germanium, 25–82.5 atomic % of carbon and 5–62.5 atomic % of silicon.

3. A spatial light modulator as defined in claim 1, wherein the light blocking layer is an amorphous film formed by a plasma chemical vapor deposition method with the use of a mixed gas selected from the group consisting of monosilane gas, hydrogenated germanium gas and methane gas.

4. A spatial light modulator as defined in claim 1, wherein the light blocking layer is an amorphous film formed by a plasma chemical vapor deposition method with the use of a mixed gas selected from the group consisting of monosilane gas, hydrogenated germanium gas and ethane gas.

5. A spatial light modulator as defined in claim 1, the photoconductive layer consists of at least one film selected from the group consisting of GaAs, hydrogenated amorphous silicon, hydrogenated amorphous silicon carbide film and amorphous selenium.

6. A spatial light modulator element as defined in claim 1, wherein the light blocking layer is an amorphous film formed by a plasma chemical vapor deposition method.

7. A spatial light modulator as defined in claim 1, wherein the light blocking layer is an amorphous film formed by a plasma chemical vapor deposition method, and the photoconductive layer is a hydrogenated amorphous silicon film formed by a plasma chemical vapor deposition method.

8. A method of manufacturing a spatial light modulator, comprising the steps of:

providing a first transparent electrode film, on a substrate, providing a photoconductive layer on said first transparent electrode film, providing a light blocking layer on said photoconductive layer, wherein the light blocking layer is an amorphous film consisting essentially of 5–45 atomic % of germanium, 17.5–92.5 atomic % of carbon and 2.5–77.5 atomic % of silicon, providing a dielectric multilayered film on said light blocking layer, providing a light modulation layer on said dielectric multilayered film, and providing a second transparent electrode film, on said light modulation layer, said light modulation layer consisting of a liquid crystal material for changing intensity, phase or running direction of read-out light, wherein the light blocking layer and the photoconductive layer are continuously formed in the same film forming device by a plasma chemical vapor deposition method.

9. A spatial light modulator comprising: a first transparent electrode film, provided on a substrate, a photoconductive layer provided on the first transparent electrode film, a light blocking layer provided on the photoconductive layer, a dielectric multilayered film provided on the light blocking layer, a light modulation layer provided on the dielectric multilayered film, and a second transparent electrode film, provided on the light modulation layer, the light modulation layer consisting of a liquid crystal material for changing intensity, phase or running direction of read-out light, wherein the light blocking layer is an amorphous film consisting essentially of 5–45 atomic % of germanium, 17.5–92.5 atomic % of carbon and 2.5–77.5 atomic % of silicon, and the photoconductive layer comprises a single crystal selected from the group consisting of a single crystal of $Bi_{12}SiO_{20}$, a single crystal of $Bi_{12}GeO_{20}$ and a single crystal of GaAs.

10. A spatial light modulator comprising: at least one photoconductive layer, a first transparent electrode film, provided on one surface of the photoconductive layer, a light blocking layer provided on the other surface of the photoconductive layer, a dielectric multilayered film provided on the light blocking layer, a light modulation layer provided on the dielectric multilayered film, and a second transparent electrode film, provided on the light modulation layer, the light modulation layer consisting of a liquid crystal material for changing intensity, phase or running direction of read-out light, and the light blocking layer consisting of a hydrogenated amorphous silicon film having a resistivity of $10^8$ $\Omega$cm to $10^{10}$ $\Omega$cm and a light absorption coefficient of $10^4$ cm$^{-1}$ to $10^5$ cm$^{-1}$ at the wavelength of 600 nm.

11. A spatial light modulator as claimed in claim 10, wherein the photoconductive layer is a film selected from the group consisting of a hydrogenated amorphous silicon film and a hydrogenated amorphous silicon carbide film.

12. A method of manufacturing a spatial light modulator, comprising the steps of:

providing a first transparent electrode film, on a substrate, providing a photoconductive layer on said first transparent electrode film, providing a light blocking layer on the photoconductive layer, providing a dielectric multilayered film on the light blocking layer, providing a light modulation layer on the dielectric multilayered film, and providing a second transparent electrode film, on the light modulation layer, wherein the light modulation layer consists of a liquid crystal material for changing intensity, phase or running direction of read-out light, and the light blocking layer consists of a hydrogenated amorphous silicon film having a resistivity of $10^8$ $\Omega$cm to $10^{10}$ $\Omega$cm and a light absorption coefficient of $10^4$ cm$^{-1}$ to $10^5$ cm$^{-1}$ at wavelength of 600 nm.

13. A method of manufacturing a spatial light modulator as defined in claim 12, wherein the light blocking layer and the photoconductive layer are continuously formed in the same device by a plasma chemical vapor deposition method.

14. A method of manufacturing a spatial light modulator, comprising the steps of:

providing a first transparent electrode film, on a substrate, providing a photoconductive layer on the first transparent electrode film, providing a light blocking layer on the photoconductive layer, providing dielectric multilayered film on the light blocking layer, providing a light modulation layer on the dielectric multilayered film, and providing a second transparent electrode film, on the light modulation layer, wherein the light modulation layer consists of a liquid crystal material for changing intensity, phase or running direction of read-out light, and the light blocking layer consists of a hydrogenated amorphous silicon film having a resistivity of $10^8$ $\Omega$cm to $10^{10}$ $\Omega$cm and a light absorption coefficient of $10^4$ cm$^{-1}$ to $10^5$ cm$^{-1}$ at the wavelength of 600 nm, the hydrogenated amorphous silicon film being formed at a temperature below 100° C., and then annealed at a temperature above 100° C. and below 120° C.

* * * * *